United States Patent [19]
Minoura et al.

[11] Patent Number: 5,592,640
[45] Date of Patent: Jan. 7, 1997

[54] DATA PROCESSING APPARATUS CAPABLE OF READING DATA FROM DIFFERENT-FORMAT CD-ROMS ACCORDING TO DIFFERENT PROCESSING METHODS OF THE DATA

[75] Inventors: Hiroshi Minoura; Shoji Yamaguchi, both of Kawasaki, Japan

[73] Assignee: Fujitsu Limited, Kawasaki, Japan

[21] Appl. No.: 347,195

[22] Filed: Nov. 21, 1994

Related U.S. Application Data

[63] Continuation of Ser. No. 817,076, Jan. 6, 1992, abandoned.

[30] Foreign Application Priority Data

Jan. 18, 1991 [JP] Japan ..................... 3-018278

[51] Int. Cl.[6] ........................................... G06F 13/12
[52] U.S. Cl. ..................... 395/428; 395/484; 395/405
[58] Field of Search ............................ 395/428, 405, 395/484

[56] References Cited

U.S. PATENT DOCUMENTS

| | | | |
|---|---|---|---|
| 4,604,748 | 8/1986 | Sato | 371/38 |
| 4,800,550 | 1/1989 | Yamauchi | 369/59 |
| 4,843,601 | 6/1989 | Eguchi et al. | 369/44 |
| 4,866,601 | 9/1989 | DuLac et al. | 364/200 |
| 4,876,651 | 10/1989 | Dawson et al. | 364/449 |
| 4,974,178 | 11/1990 | Izeki et al. | 395/100 |
| 5,010,539 | 4/1991 | Terashima et al. | 369/50 |
| 5,019,816 | 5/1991 | Hosono | 341/77 |
| 5,065,345 | 11/1991 | Knowles et al. | 395/154 |
| 5,150,465 | 9/1992 | Bush et al. | 395/275 |
| 5,185,732 | 2/1993 | Ogawa et al. | 369/47 |
| 5,200,943 | 4/1993 | Sano et al. | 369/48 |
| 5,241,671 | 8/1993 | Reed et al. | 395/600 |
| 5,257,254 | 10/1993 | Kutaragi | 369/50 |

FOREIGN PATENT DOCUMENTS

| | | |
|---|---|---|
| 0278133 | 8/1988 | European Pat. Off. . |
| 2141566 | 12/1984 | United Kingdom . |

OTHER PUBLICATIONS

European Search Report, The Hague, completed Apr. 23, 1992.

PC Week Sep. 12, 1988 "Major firms join to develop CD Rom Audio and graphics".

*Primary Examiner*—Reba I. Elmore
*Attorney, Agent, or Firm*—Staas & Halsey

[57] ABSTRACT

A data processing system, which includes a CD-ROM drive, addresses data in a CD-ROM and commands the CD-ROM drive to read the data. The data processing system selects one of a plurality of control programs corresponding to a format of the data in the CD-ROM used, and controls the CD-ROM drive to read the data addressed by using the control programs. Further, the data processing system processes the data read in a accordance with the data format and stores the data processed in a memory.

18 Claims, 4 Drawing Sheets

DATA PROCESSING APPARATUS CAPABLE OF READING DATA FROM DIFFERENT-FORMAT CD-ROMS ACCORDING TO DIFFERENT PROCESSING METHODS OF THE DATA

This application is a continuation of application Ser. No. 07/817,076, filed Jan. 6, 1992, now abandoned.

BACKGROUND OF THE INVENTION

1. Field of the Invention

The present invention relates to a data processing apparatus including a compact-disk read only memory (called CD-ROM) and method thereof.

In recent years personal computers have become more and more high-speed and powerful. With the increase in data quantity and diversification of data processing, demand for an external storage medium with a large storage capacity is ever increasing. A personal computer equipped with a CD-ROM, (which is a non-magnetic disk) has a much larger storage capacity than a personal computer equipped with magnetic disks.

Although audio data, video data and data for information processing (hereinafter called computer data) can be recorded on a CD-ROM per se, conventional CD-ROMs record these types of data in track units, so that these types of data cannot be read at the same time for use in practically concurrent processing (hereinafter a CD-ROM of this data format is called a CD-ROM format disk). However, demand for a data processing system which can read these types of data simultaneously from a single CD-ROM and can perform data processing, audio-reproducing and graphics-displaying in synchronization, is ever increasing. To meet this demand, a CD-ROM XA (Extended Architecture) system, which is the extention of a the basic capabilities of CD-ROM system, is being established as an international standard.

The CD-ROM XA system allows high-quality voices, such as those recorded on audio compact disks to be reproduced in synchronization with graphics being displayed, by recording both audio and video data in continuous sectors of a disk track. It also allows audio, video and computer data to be processed independently with individual processors, therefore reducing the load of a central processing unit (CPU) which processes computer data, by recording such data together in a single track in sector units (hereinafter a CD-ROM of this data format is called a CD-ROM XA format disk). The CD-ROM XA system records audio data in a compressed data format to allow room for other information (i.e., video and computer data).

Accordingly, a data processing apparatus including a CD-ROM drive which can control both tile CD-ROM format disk and CD-ROM XA format disk economically and effectively, is in great demand.

2. Description of the Related Art

Conventionally, two types of CD ROM readers are used to control a CD-ROM drive to read data from a CD-ROM and to provide the data read to a processor. The first type is an individual circuit (including firmware) specifically designed either for a CD-ROM format or CD-ROM XA format disk and the second type has the above two circuits combined, designed for the CD-ROM format disk and the CD-ROM XA format disk.

Accordingly, a problem is that, in order to control both CD-ROM format and CD-ROM XA format disks, the first-type CD-ROM reader is inconvenient because two circuits must be changed, these two circuits being the ones for controlling the CD-ROM format disk and the CD-ROM XA format disk, respectively.

Another problem is that the second type CD-ROM reader is costly because two circuits of the first-type are required to control both CD-ROM format and CD-ROM XA format disks.

Still another problem is that the second-type CD-ROM reader is large-sized and inferior in reliability because of the large amount of circuitry required to control both the CD-ROM format and CD-ROM XA format disks.

SUMMARY OF THE INVENTION

It is an object of the present invention to provide a data processing system including a CD-ROM and method thereof, which can control economically and efficiently both CD-ROM format and CD-ROM XA format disks.

It is another object of the present invention to provide a small-sized and reliable data processing system including a CD-ROM, which can control both CD-ROM format and CD-ROM XA format disks.

To achieve the above and other objects, the present invention provides command means for addressing data in the CD-ROM and commanding a CD-ROM drive to read the data, memory means for storing data read from the CD-ROM, a plurality of control means, each corresponding to different formats of data recorded in the CD-ROM, for controlling the CD-ROM drive to read the data addressed by the command means, for processing the data read in accordance with the data formats and for storing the data processed into the memory means, and selection means for selecting one of the plurality of control means.

BRIEF DESCRIPTION OF THE DRAWINGS

Throughout the above mentioned drawings, identical reference numerals are used to designate the same or similar component parts.

DESCRIPTION OF THE PREFERRED EMBODIMENTS

Figure 1:
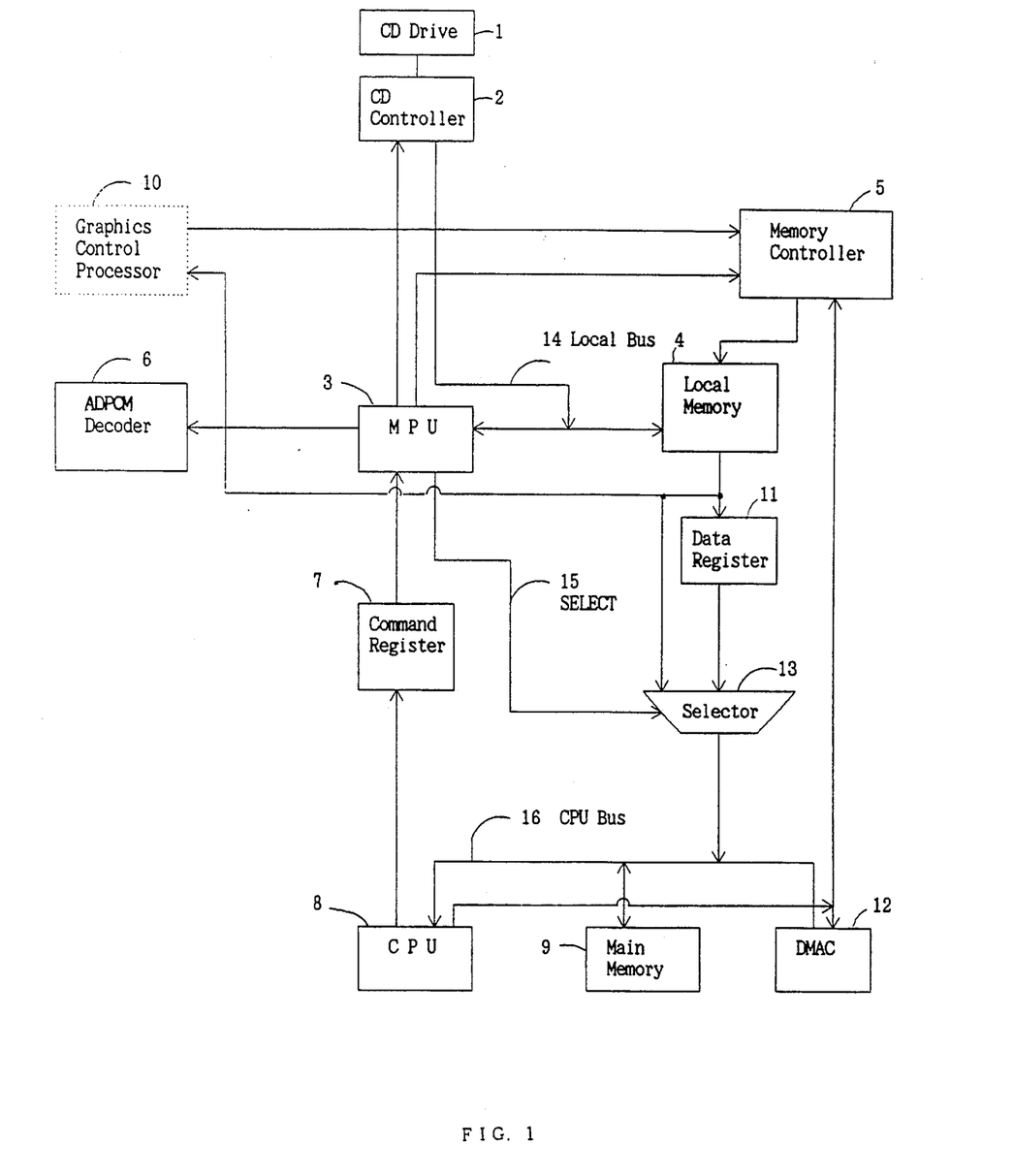
FIG. 1 is a block diagram of a CD-ROM reader according to an embodiment of the present invention.

FIG. 1 is a block diagram of a CD-ROM reader of the present invention, which can read both CD-ROM format and CD-ROM XA format disks.

A central processing unit (hereinafter abbreviated CPU) 8, which is a processor unit of a personal computer, etc., performs data processing under control of a program.

A main memory 9 is the CPU's working memory which stores the program and data for data processing.

A CD drive 1 (including a CD-ROM which records computer data for the CPU 8 and audio data for an Adaptive Differential Pulse Coded Modulation (ADPCM) decoder 6 for reproducing a voice) comprises a mechanism for driving the disk and for reading data recorded on the CD-ROM by detecting the light which is transmitted from a laser diode and reflected from the disk.

A local memory 4 is a buffer for storing the data read from the CD-ROM. The data is stored there along with the sector number where the data is recorded on the CD-ROM. Each storage location of the local memory 4 has its address assigned to the CPU-addressable memory space so that the CPU 8 can access the data in the local memory 4 directly with an instruction.

A direct memory access controller (hereinafter abbreviated DMAC) 12 transfers the data read by the CD drive 1 to the main memory 9 in a direct memory access (called DMA) mode, via the local memory 4 and data register 11.

The ADPCM decoder 6 reproduces a voice by decoding the ADPCM-modulated data read from the CD-ROM A microprocessor unit (hereinafter abbreviated MPU) 3, with firmware of three control programs 1, 2 and 3 stored singly or in combination, controls the CD drive 1 to read data from the CD-ROM and stores the data read into the local memory 4, for use by the CPU 8 and ADPCM decoder 6 or for transfer to the main memory. The control program 1 stores the data read from a CD-ROM format disk into the local memory 4 in a read-ahead buffering method; the control program 2, in a cache control method; and the control program 3 stores data read from a CD-ROM XA format disk into the local memory 4 for use by the processors such as the CPU 8 and ADPCM decoder 6. Operations performed by each control program are described below with reference to FIGS. 2–4, respectively.

A memory controller 5 controls the local memory 4 to write/read data to/from the local memory 4 and activates the DMAC 12 to perform DMA-mode data transfer.

A selector 13 selectively connects the output of the local memory 4 or data register 11 with a CPU bus 16 according to a control signal SELECT from the MPU 3.

The CD drive 1 requires a longer seek time and, therefore, needs a longer average access time as, compared with a magnetic disk drive such as a hard disk drive. To practically reduce the access time in reading a CD-ROM format disk, the present invention introduces two methods: a read ahead buffering method and a cache control method.

Figure 2:
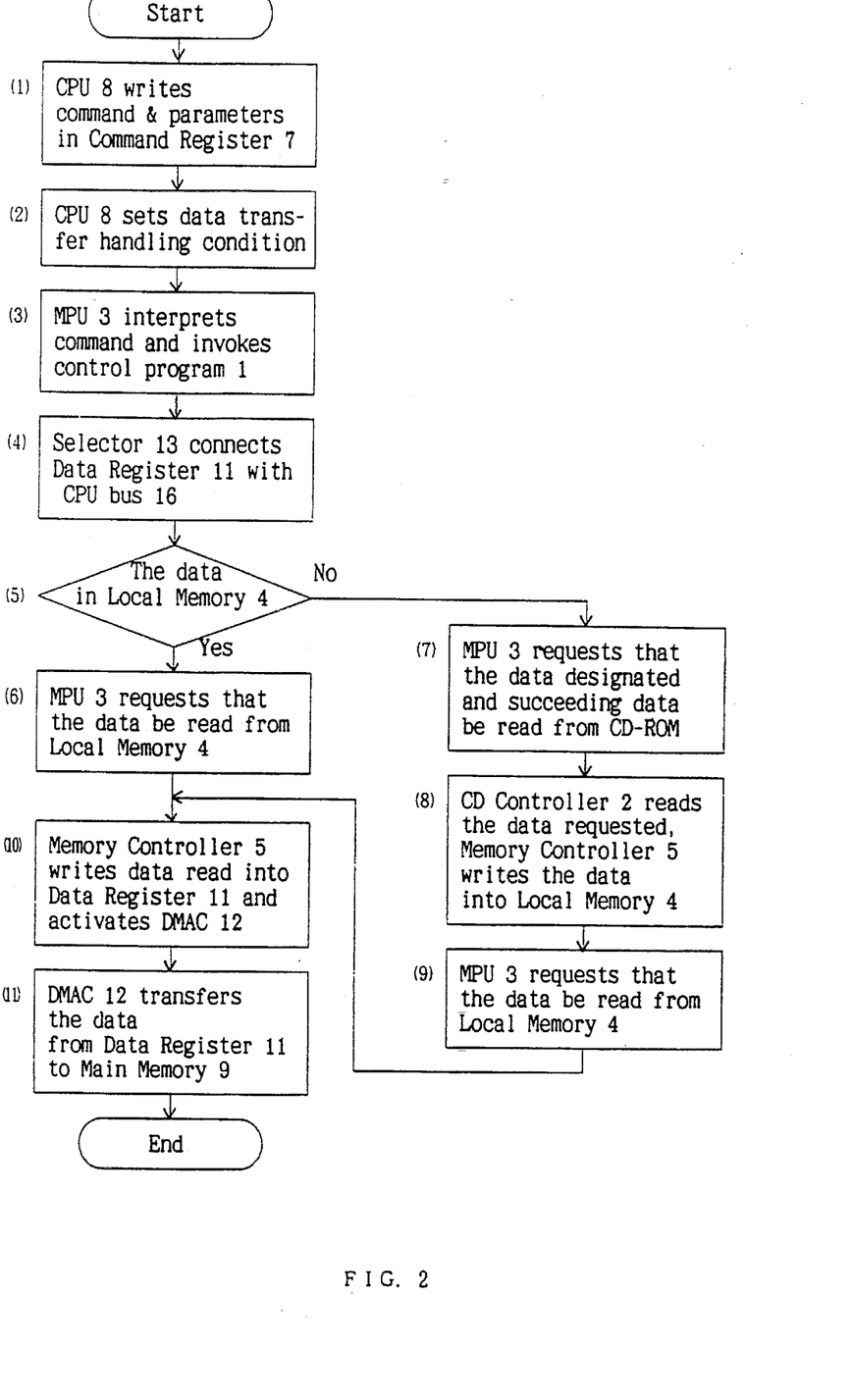
FIG. 2 shows an operation to read a CD-ROM format disk in a read-ahead buffering method according to the embodiment of FIG. 1.

FIG. 2 shows an operation to read a CD-ROM format disk in a read-ahead buffering method.

The read-ahead buffering method is useful when the CPU 8 needs data stored in physically continuous or adjacent sectors of a CD-ROM track.

The read ahead buffering method is performed according to steps (1)–(11) of FIG. 2, as follows:

(1) The CPU 8 writes a read command and parameters in a CD command register 7. The read command designates the read-ahead buffering method and an operation to read data from a CD-ROM format disk and to store tile data in main memory 9. The parameters designate the location (a disk track and sector) where data to be read is recorded and the number of sectors to be read.

(2) The CPU 8 also writes a data transfer handling condition in the DMAC 12. Then, the DMAC 12 enters a wait state to wait for a data transfer request from memory controller 5. The data transfer handling condition includes a main memory data address (abbreviated DA) where data is to be stored and a byte count (abbreviated BC) which designates the number of bytes to be transferred.

(3) The MPU 3 interprets the command and parameters in the CD command register 7 and invokes tile control program 1.

(4) The MPU 3 sends the SELECT signal is to the selector 13 to operatively connect the output of the data register 11 with the CPU bus 16.

(5) The MPU 3 determines whether the data requested by the CPU 8 is in the local memory 4, by comparing the sector number of the parameters with that stored in the local memory 4.

(6) When the data requested is in the local memory 4, the MPU 3 requests the memory controller 5 to read the data from the local memory 4.

(7) When the data requested is not in the local memory 4, the MPU 3 requests the CD controller 2 to read the data designated by the parameters and the data recorded in the following sectors, from the CD-ROM.

(8) The CD controller 2 controls the CD drive 1 to read the data in the sector designated and the following sectors. The memory controller 5 transfers the data read to the local memory 4 via the local bus 14 in a read-ahead buffering method. The data transfer continues until the local memory 4 becomes full or the CPU 8 requests data to be read from other CD-ROM locations.

(9) When the first sector (about 2 kilobytes) of data is transferred to the local memory 4, the MPU 3 requests the memory controller 5 to output the data requested by the CPU 8 from the local memory 4.

(10) The memory controller 5 reads the data requested from the local memory 4 and writes it into the data register 11 in units of one or multiple bytes, and issues a data transfer request to the DMAC 12.

(11) On responding to the request from the memory controller 5, the DMAC 12 transfers the data in the data register 11 to the main memory 9. The DMAC 12 repeats the above transfer operation the number of times required by the byte count BC.

Figure 3:
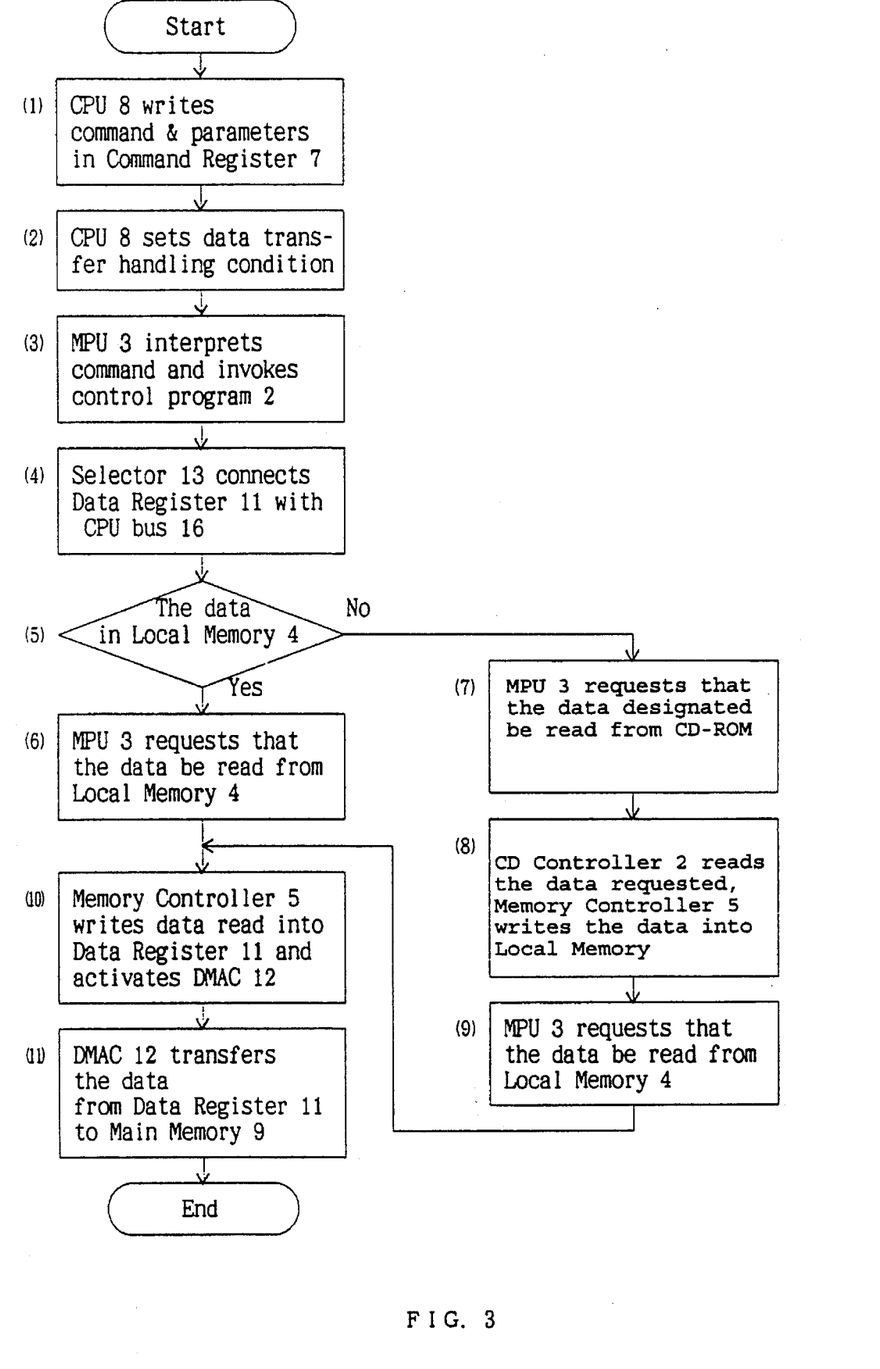
FIG. 3 shows an operation to read a CD-ROM format disk according to the embodiment of FIG. 1 in a cache control method.

FIG. 3 shows an operation to read a CD-ROM format disk in a cache control method.

The cache control method is useful when the CPU 8 repeatedly uses the same data which is stored in the CD-ROM.

The cache control method is performed according to steps (1)–(11) of FIG. 3. The cache control method is controlled by using the circuit shown in FIG. 1 almost the same way as the read-ahead buffering method. The only difference is that in step (3), the MPU 3 invokes the control program 2; and in step (8), the CD memory controller 5 write the data read from the CD-ROM into a local memory location designated by the MPU 3 in a cache control method. The MPU 3 designates the location whose data the MPU 3 determines to be least significant, based on statistics of frequency in use, for example. Accordingly, data having a great possibility of being used by the CPU 8 is stored in the local memory 4.

Thus, both the read-ahead buffering and cache control methods can be realized by using the same hardware and switching the firmware (or control programs) designed for each method.

Figure 4:
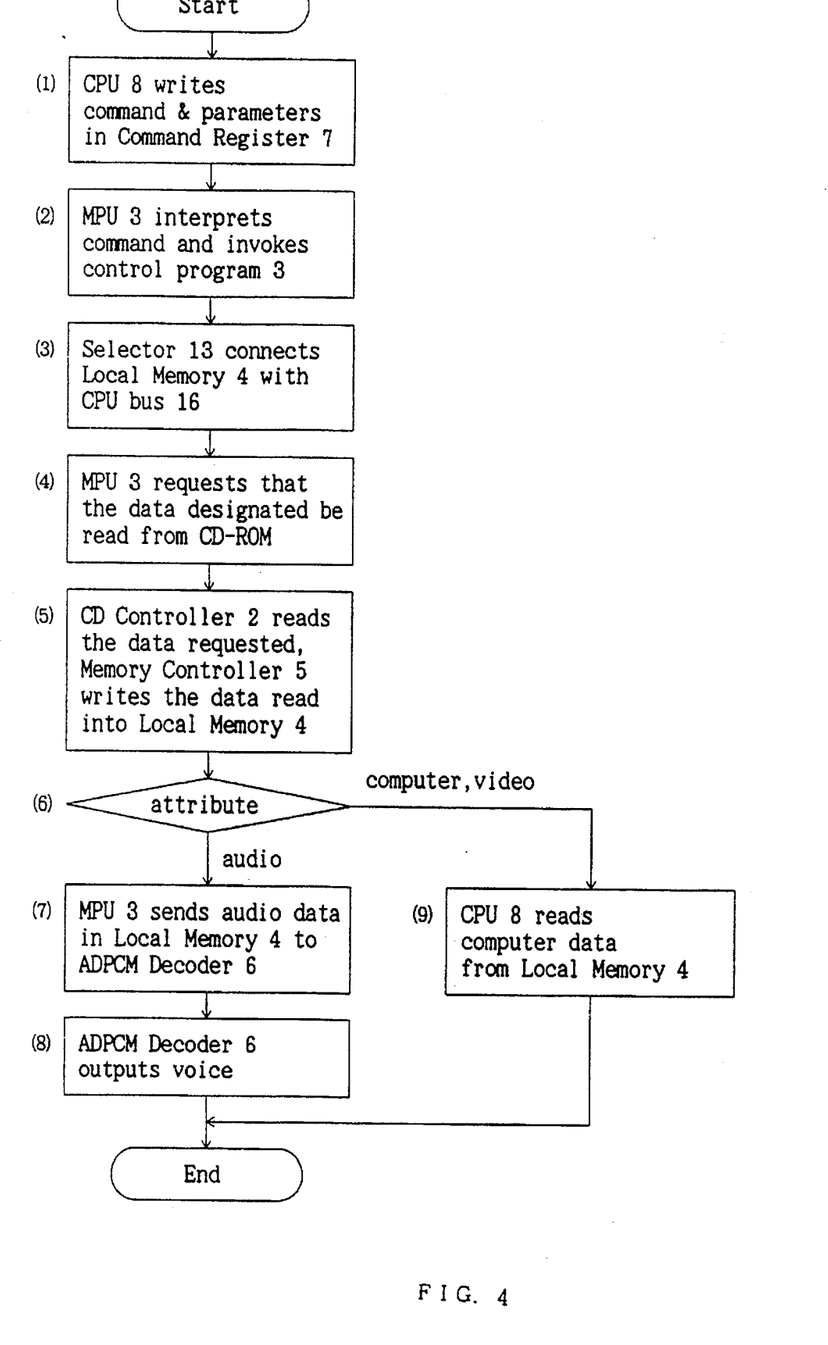
FIG. 4 shows an operation to read s CD-ROM XA format disk.

FIG. 4 shows an operation to read a CD-ROM XA format disk;

The present invention allows a CD ROM XA format disk to be read by using the circuit shown in FIG. 1 as well as shown in steps (1)–(9) of FIG. 4.

(1) The CPU 8 writes a read command and parameters in a CD command register 7. The read command designates an operation to read data from a CD-ROM XA format disk and to store the data in local memory 4. The parameters designate the location (a disk track and sector) where data to be read from the CD-ROM XA format disk is recorded and the number of sectors to be read.

(2) The MPU 3 interprets the command and parameters in the CD command register 7 and invokes the control program 3.

(3) The MPU 3 sends the SELECT signal to the selector 13 to operatively connect the output of the local memory 4 with the CPU bus 16.

(4) The MPU 3 requests the CD controller 2 to read the data designated by the parameters from the CD-ROM.

(5) The CD controller 2 controls the CD drive 1 to read audio, video and/or computer data from the CD-ROM. The memory controller 5 writes the data read into the local memory 4 via the local bus 14. Each of the audio, video and computer data of the CD-ROM XA format includes an attribute byte for every 1 sector (about 2 kilo-bytes) of data.

(6) The MPU 3 checks the data in the local memory 4 for an audio attribute.

(7) The MPU 3 sends the data having the audio attribute to the ADPCM decoder 6.

(8) The ADPCM decoder 6 decodes the audio data by expanding the compressed-format audio data and reproduces a voice.

(9) The CPU 8 reads the data having the computer attribute from the local memory 4 for data processing.

Thus, by referring to the attribute bytes stored in the local memory 4, the CPU 8 can easily identify the data necessary for its processing, thus reducing the CPU load. Furthermore, by providing a video control processor 10 under the control of the MPU 3 in the same way as tile ADPCM decoder 6 and by using the local memory 4 as a buffer for the audio, video and computer data, voice-reproducing and graphics displaying can be made in synchronization with the operations of the CPU 8, thus reducing the CPU load.

As is apparent by the above description, the present invention can provide a data processing system which can control both the CD-ROM format or CD-ROM XA format disks with a single hardware circuit and by selectively using appropriate software. Therefore, the present invention can provide an economical, small-sized and reliable data processing system which can control both the CD-ROM format or CD-ROM XA format disks.

What is claimed is:

1. A data processing apparatus for processing data of a CD-ROM which stores the data of one of plural, different formats, said data processing apparatus comprising:

a central processing unit issuing read commands based upon one of commands from a user and an application program;

a CD-ROM drive which reads the data from the CD-ROM;

command means for addressing the data in the CD-ROM, commanding the CD-ROM drive to read the data and specifying one of the plural and different formats and one of methods of processing the data read from the CD-ROM, based upon the read commands from the central processing unit;

memory means for storing the data read from the CD-ROM, wherein said memory means comprises an address space having a plurality of memory locations, each memory location being assigned an address which is addressable by said central processing unit so that a program instruction from said central processing unit directly accesses said memory means;

a main memory receiving and storing the data stored in said memory means in response to a memory control command from said command means;

a plurality of control means corresponding to the plural, respective and different formats of the data and methods of processing the data that are specified by said command means, each control means controlling the CD-ROM drive to read the data with the corresponding format addressed by said command means, for processing the data with the corresponding formats read in accordance with the corresponding formats and processing methods and for storing the data processed using the corresponding formats into said memory means; and selection means for selecting one of said plurality of control means.

2. A data processing apparatus according to claim 1, said data processing apparatus further comprising:

direct memory access control means for transferring the data from said memory means to the main memory in a direct memory access mode.

3. A data processing apparatus according to claim 1, wherein the data of the one of the plural and different formats has a plurality of different attributes, said data processing apparatus further comprising a plurality of processors for processing the data of one of said plural and different formats, each one of said plurality of processors processing single attribute type data stored in said memory means and said central processing unit processing computer data stored in said main memory.

4. A data processing apparatus according to claim 1, wherein the different formats of the data include CD-ROM format data stored in a corresponding CD-ROM format disk and CD-ROM-XA data stored in a corresponding CD-ROM XA format disk, wherein said plurality of control means comprises:

first control means for controlling the CD-ROM format disk; and second control means for controlling the CD-ROM XA format disk.

5. A data processing apparatus according to claim 4, wherein:

said command means designates a type of the CD-ROM used; and said selection means is responsive to the designation made by the command means for selecting the corresponding one of said first control means and second control means.

6. A data processing apparatus according to claim 4, wherein said first control means comprises:

read-ahead means for controlling the CD-ROM drive to read the data addressed by said command means and following data, and storing the data and following data read in said memory means in a read-ahead method;

cache control means for controlling the CD-ROM drive to read the data addressed by said command means and storing the data read in said memory means in a cache control method; and switching means for selecting one of said read-ahead means and cache control means.

7. A data processing apparatus according to claim 6, wherein:

said command means designates one of said read-ahead means and cache control means; and said switching means is responsive to the designation made by said command means for selecting one of said read-ahead means and cache control means.

8. A data processing apparatus according to claim 4, wherein the data of the one of the plural and different formats has a plurality of different attributes, said data processing apparatus further comprising an audio reproducing apparatus; and said second control means supplying said audio reproducing apparatus with data stored in said memory means and having a first one of said plurality of different attributes.

9. A data processing apparatus according to claim 8, wherein said data processing apparatus further comprises:

a video display apparatus; and said second control means supplying said video display apparatus with data stored in said memory means having a second one of said plurality of different attributes.

10. A data processing apparatus having a central processing unit, a main memory storing information data and a program to control the central processing unit, for reading the information data from one of a CD-ROM formatted disk storing the information data in different track units and a CD-ROM XA formatted disk storing the information data in a single track in sector units, said data processing apparatus comprising:

a CD-ROM drive for reading the information data from a formatted disk loaded therein, said loaded disk being one of the CD-ROM formatted disk and the CD-ROM XA formatted disk;

a CD-ROM controller controlling the CD-ROM drive to read the information data;

a local memory for storing the information data read from said CD-ROM drive and a sector number identifying a location of the information data on the formatted disk which is read by the CD drive, said local memory comprising an address space having a plurality of memory locations, each memory location being assigned an address which is addressable by said central processing unit so that a program instruction from said central processing unit directly accesses said local memory; and control means storing a plurality of control programs, for controlling transfer of the information data from the local memory to the main memory in dependence upon a particular type of format of the loaded disk, by using one of the plurality of control programs.

11. The data processing apparatus as claimed in claim 10, wherein the information data has a plurality of different attributes, said data processing apparatus further comprising:

sound reproducing means for receiving, from the local memory, first ones of the information data having a first one of said plurality of different attributes, the first ones of the information data which have the first one of said plurality of different attributes being sound data which is stored in the CD-ROM XA formatted disk, said sound reproducing means generating sound in response to the sound data; and video reproducing means for receiving, from the local memory, second ones of the information data having a second one of said plurality of different attributes, the second ones of the information data which have the second one of said plurality of different attributes being video data which is stored in the CD-ROM XA formatted disk, said video reproducing means generating a video display in response to the video data.

12. The data processing apparatus as claimed in claim 11, wherein said control means further comprises:

command register means for storing parameters designating a disk track and said sector number of the loaded disk from which the information data is to be read;

microprocessing means for interpreting said parameters stored in the command register means and invoking said one of said plurality of control programs;

data register means for storing the information in byte units;

memory control means for transferring the information data from the local memory to said data register means in response to a first control signal from said microprocessing means; and direct memory access control means for transferring the information data from the data register means to the main memory in response to a second control signal from said memory control means; and wherein said microprocessing means checks an attribute of the information data stored in said local memory, and sends the information data containing sound data to said sound reproducing means and sends the information data containing video data to said video reproducing means in response to said check.

13. The data processing apparatus as claimed in claim 11, wherein said control means further comprises:

command register means for storing parameters designating a disk track and said sector number of the loaded disk from which the information data is to be read;

microprocessing means for interpreting said parameters stored in the command register means and activating said one of said plurality of control programs;

data register means for storing the information in byte units;

memory control means for transferring the information data from the local memory to said data register means in response to a first control signal from said microprocessing means; and direct memory access control means for transferring the information data from the data register means to the main memory in response to a second control signal from said memory control means.

14. The data processing apparatus as claimed in claim 13, wherein if said loaded disk is said CD-ROM formatted disk, said microprocessing means determines whether the information data requested by the central processing unit is stored in said local memory, and if said determination is negative, said microprocessing means requests said CD-ROM controller to control said CD-ROM drive to read the information data requested by the central processing unit before requesting said memory control means to transfer the information data from said local memory to said data register means.

15. A method of processing data from a disk loaded in a CD-ROM drive of a data processing apparatus for selectively reading a CD-ROM formatted disk storing information data in different track units and a CD-ROM XA formatted disk storing the information data in a single track in sector units, wherein said loaded disk is a CD-ROM formatted disk, said method comprising:

writing a read command and parameters to a command register, said read command designating a read-ahead method and said parameters designating a disk track and a sector of the loaded disk from which the information data is to be read;

interpreting said read command and parameters in a processing means and activating a read-ahead buffering program;

making a determination whether the information data is stored in a local memory;

requesting that the information data be read from the local memory, transferring the data from the local memory to a data register by using a memory controller, issuing a data transfer request to a direct memory access controller, and transferring the information data from the data register to a main memory, if said determination is positive; and reading the information data from the loaded disk, writing the information data in the local memory, requesting that the information data be read from the local memory, transferring the data from the local memory to a data register by using a memory controller, issuing a data transfer request to a direct memory access controller, and transferring the information data from the data register to a main memory, if said determination is negative.

16. A method of processing data from a disk loaded in a CD-ROM drive of a data processing apparatus for selectively reading a CD-ROM formatted disk storing information data in different track units and a CD-ROM XA formatted disk storing the information data in a single track in sector units, wherein said loaded disk is a CD-ROM formatted disk, said method comprising:

writing a read command and parameters to a command register, said read command designating a cache control buffering method and said parameters designating a disk track and a sector of the loaded disk from which the information data is to be read;

interpreting said read command and parameters in a processing means and activating a cache control program;

making a determination whether the information data is stored in a local memory;

requesting that the information data be read from the local memory, transferring the data from the local memory to a data register by using a memory controller, issuing a data transfer request to a direct memory access controller, and transferring the information data from the data register to a main memory, if said determination is positive; and reading the information data from the loaded disk, overwriting the information data in the local memory, requesting that the information data be read from the local memory, transferring the data from the local memory to a data register by using a memory controller, issuing a data transfer request to a direct memory access controller, and transferring the information data from the data register to a main memory, if said determination is negative.

17. The method as claimed in claim 16, wherein said overwriting in the local memory is based upon frequency of use of the information data stored in the local memory.

18. A method of processing data from a disk loaded in a CD-ROM drive of a data processing apparatus for selectively reading a CD-ROM formatted disk storing information data in different track units and a CD-ROM XA formatted disk storing the information data in a single track in sector units, wherein said loaded disk is a CD-ROM XA formatted disk, said method comprising:

writing a read command and parameters to a command register, said read command designating a cache control buffering method and said parameters designating a disk track and said sector units of the loaded disk from which the information data is to be read;

interpreting said read command and parameters in a processing means and activating a CD-ROM XA control program;

requesting that the information data be read from the loaded disk by using processing means, transferring the data from the loaded disk to a local memory by using a memory controller;

checking an attribute byte for each sector unit of the information data;

sending the information data having an audio attribute from the local memory to an audio reproducing means to reproduce sound, based upon said check;

sending the information data having a video attribute from the local memory to a video reproducing means to reproduce video, based upon said check; and sending the information data having a computer attribute from the local memory to a central processing unit, based upon said check.

* * * * *

UNITED STATES PATENT AND TRADEMARK OFFICE
CERTIFICATE OF CORRECTION

PATENT NO. : 5,592,640
DATED : January 7, 1997
INVENTOR(S) : Hiroshi MINOURA et al.

It is certified that error appears in the above-indentified patent and that said Letters Patent is hereby corrected as shown below:

line 36, after "of" insert --a--.

Col. 2,      line 4, after "second" insert -- - --;

line 42, after "disk" insert --in a cache control method--.

lines 43-44, delete "in a cache control method--.

line 46, after "disk" insert --according to the embodiment of Fig. 1--.

Col. 3,      line 15, insert "." after "ROM".

line 37, delete ",".

line 55, after "sectors" insert --is--.

Col. 4,      line 1, change "is" to --15--.

UNITED STATES PATENT AND TRADEMARK OFFICE
CERTIFICATE OF CORRECTION

PATENT NO. : 5,592,640
DATED : January 7, 1997
INVENTOR(S) : Hiroshi Minoura et al.

It is certified that error appears in the above-indentified patent and that said Letters Patent is hereby corrected as shown below:

Col. 8,    line 12, delete "and".

Signed and Sealed this

Twenty-ninth Day of July, 1997

Attest:

BRUCE LEHMAN

Attesting Officer

Commissioner of Patents and Trademarks